(12) United States Patent
Anderson et al.

(10) Patent No.: US 9,287,578 B2
(45) Date of Patent: Mar. 15, 2016

(54) POLYOXOMETALATE FLOW BATTERY

(71) Applicant: Sandia Corporation, Albuquerque, NM (US)

(72) Inventors: Travis M. Anderson, Albuquerque, NM (US); Harry D. Pratt, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 526 days.

(21) Appl. No.: 13/760,956

(22) Filed: Feb. 6, 2013

(65) Prior Publication Data
US 2016/0043425 A1 Feb. 11, 2016

(51) Int. Cl.
*H02J 7/00* (2006.01)
*H01M 8/20* (2006.01)
*H01M 8/18* (2006.01)

(52) U.S. Cl.
CPC .............. *H01M 8/20* (2013.01); *H01M 8/188* (2013.01)

(58) Field of Classification Search
CPC ...................................... Y02E 60/12
USPC ......................................... 320/128
See application file for complete search history.

(56) References Cited

U.S. PATENT DOCUMENTS

| 2011/0014527 A1* | 1/2011 | Ohlsen | 429/408 |
|---|---|---|---|
| 2011/0195283 A1 | 8/2011 | Sun et al. | |
| 2012/0813866 | 7/2012 | Lee et al. | |
| 2014/0050947 A1* | 2/2014 | Donnelly | 429/7 |

OTHER PUBLICATIONS

Altenau, J., et al., "Models for heteropoly blues. Degrees of valence trapping in vanadium (V)- and molybdenum (VI)-substituted Keggin anions", Inorg. Chem., 14(2), (1975), 417-421.

Cadot, E. et al., "Electrochemical properties and ESR characterization of mixed valence $\alpha\text{-}[XMo_{3-x}V_xW_9O_{40}]^{(n-)}$ heteropolyanions with X+P(V) and Si(IV), x=1, 2, or 3", Inorg. Chem., 35(2), (1996), 282-288.

Finke, R. G., et al., "Trisubstituted heteropolytungstates as soluble metal oxide analogues. 3. Synthesis, characterization, $^{31}P$, $^{29}Si$, $^{51}V$, and 1- and 2-D $^{183}W$ NMR, Deprotonation, and $H^+$ mobility studies of organic solvent soluble forms of $H_xSiW_9V_3O_{40}^{x-7}$ and $H_xP_2W_{15}V_3O_{62}^{x-9}$", J. Am. Chem. Soc., 108(11), (1986), 2947-2960.

(Continued)

*Primary Examiner* — Suresh Memula
(74) *Attorney, Agent, or Firm* — Michael A. Beckett

(57) ABSTRACT

Flow batteries including an electrolyte of a polyoxometalate material are disclosed herein. In a general embodiment, the flow battery includes an electrochemical cell including an anode portion, a cathode portion and a separator disposed between the anode portion and the cathode portion. Each of the anode portion and the cathode portion comprises a polyoxometalate material. The flow battery further includes an anode electrode disposed in the anode portion and a cathode electrode disposed in the cathode portion.

4 Claims, 6 Drawing Sheets

(56) References Cited

OTHER PUBLICATIONS

Harmalker, S. P., et al., "Mixed-valence chemistry of adjacent vanadium centers in heteropolytungstate anions. 1. Synthesis and electronic structures of mono-, di-, and tri-substituted derivatives of $\alpha\text{-}[P_2W_{18}O_{62}]^{6-}$", J. Am. Chem. Soc., 105(13), (1983), 4286-4292.

Kawasaki, N., et al., "Nanohybridization of Polyoxometalate Clusters and Single-Wall Carbon Nanotubes: Applications in Molecular Cluster Batteries," Angew. Chem. Int. Ed., 50, (2011), 3471-3474.

Knoth, W. H., et al., "Heteropolyanions of the types $M_3(W_9PO_{34})_2^{12-}$ and $MM'M''(W_9PO_{34})_2^{12-}$: Novel coordination of nitrate and nitrite", Inorg. Chem., 25, (1986), 1577-1584.

Li, C., et al., "Electrochemical behavior of vanadium-substituted Keggin-type polyoxometalates in aqueous solution", J. Appl. Electrochem., 39, (2009), 421-427.

Lira-Cantu and Romero, G. P., "Electrochemical and Chemical Syntheses of the Hybrid Organic-Inorganic Electroactive Material Formed by Phosphomolybdate and Polyaniline. Application as Cation-Insertion Elecgtrodes", Chem. Mater. (1998) 10, 698-704.

Matsuda, Y., et al., "A rechargeable redox battery utilizing ruthenium complexes with non-aqueous organic electrolyte", J. Appl. Electrochem., 18, (1988), 909-914.

Mossoba, M. M., et al., "Mixed valence and magnetically coupled vanadate domains in heteropoly tungstate anions", J. Am. Chem. Soc., 102(22), (1980), 6864-6866.

Sleightholme, A. E., et al., "Non-aqueous manganese acetylacetonate electrolyte for redox flow batteries", J. Power Sources, 196, (2011), 5742-5745.

Smith, D. P., et al., "Heteropoly 12-metallophosphates containing tungsten and vanadium. Preparation, voltammetry, and properties of mono-, di-, tetra- and hexavanado complexes", Inorg. Chem., 12(2), (1973), 331-336.

Wadia, C. P., et al., "Resource constraints on the battery energy storage potential for grid and transportation applications", J. Power Sources, 196, (2011), 1593-1598.

Wang, H. et al., "In Operando X-ray Absorption Fine Structure Studies of Polyoxometalate Molecular Cluster Batteries: Polyoxometalates as Electron Sponges," J. Am. Chem. Soc., 134, (2012) 4918-4924.

Weber, A. Z. et al., "Redox flow batteries: a review", J Appl. Electrochem., 41, (2011), 1137-1164.

Yang, Z., et al., "Electrochemical energy storage for green grid", Chem. Rev., 111, (2011), 3577-3613.

* cited by examiner

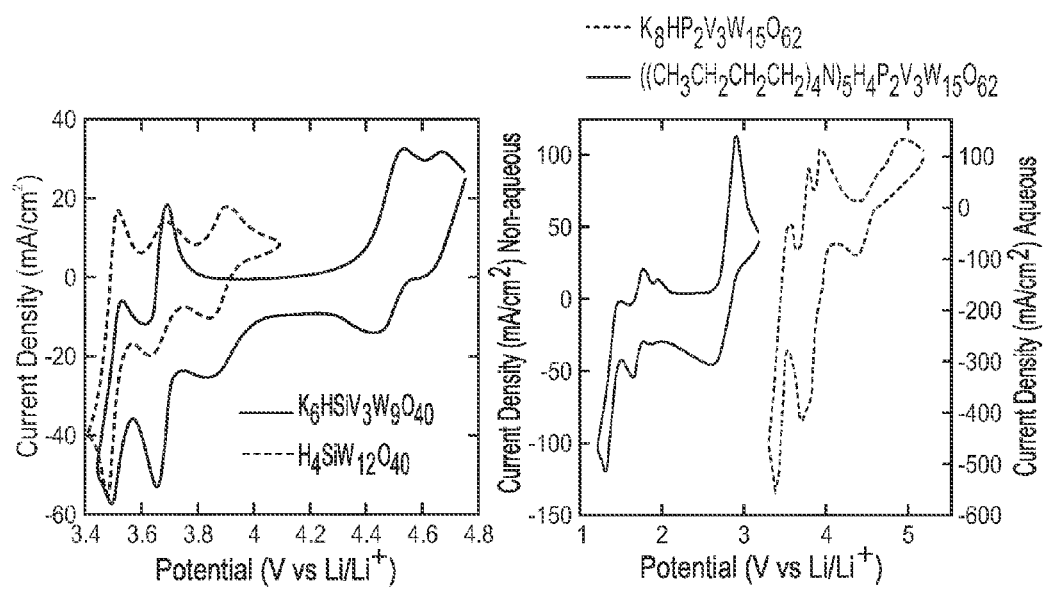
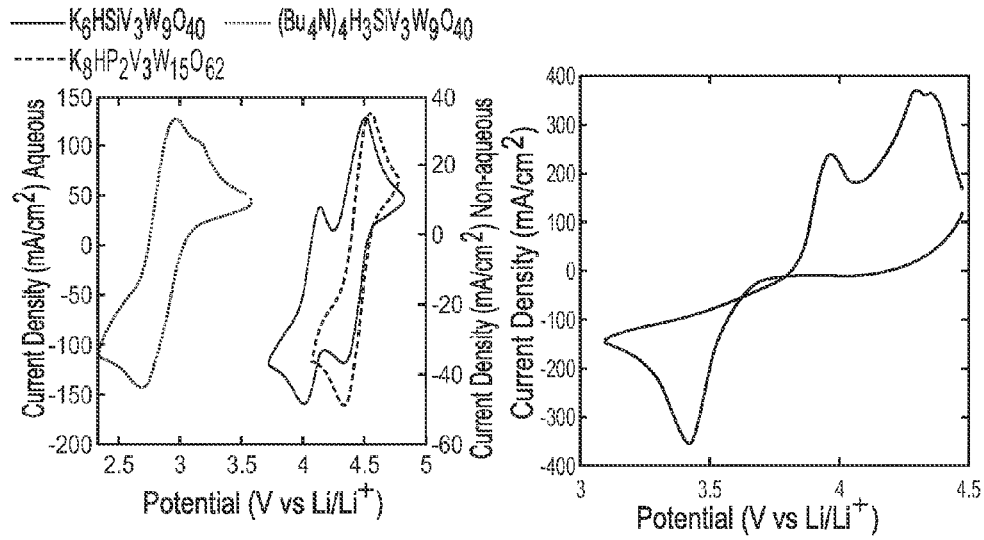
FIG. 3A
FIG. 3B
FIG. 3C
FIG. 3D

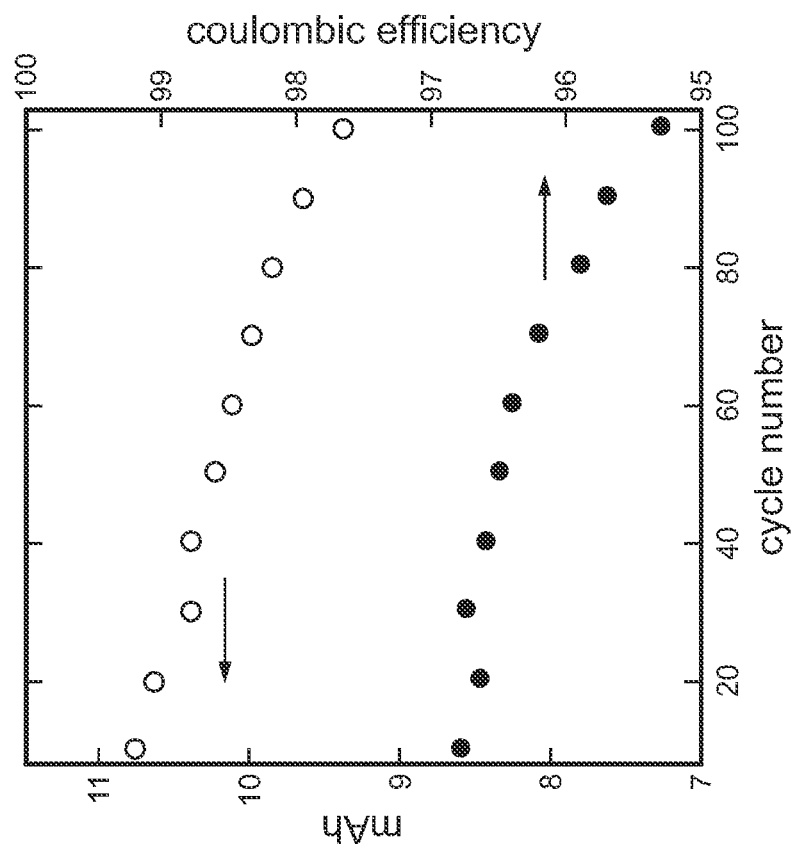
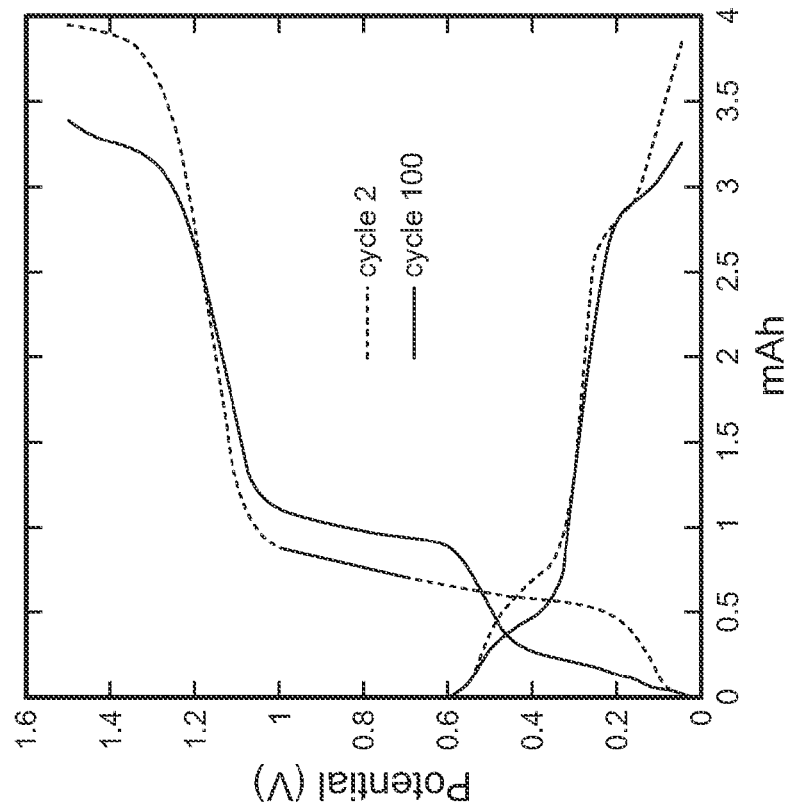
FIG. 6A
FIG. 6B

POLYOXOMETALATE FLOW BATTERY

GOVERNMENT RIGHTS

This invention was developed under Contract No. DE-AC04-94AL85000 between Sandia Corporation and the U.S. Department of Energy. The Government has certain rights in the invention.

BACKGROUND

Global energy consumption is projected to increase at least two-fold by mid-century, and this increased need will be met, at least in part, through use of renewable energy sources. Due to the intermittent nature of these resources, large-scale energy storage sources must likewise be invented, developed, and deployed in this timeframe in order for these carbon neutral technologies to be fully utilized and to aid in controlling $CO_2$ emissions. The need for grid storage is also being driven by the evolving nature of the grid (smart grid, green grid, and the distributed nature of the grid) as well as by other technological developments, such as vehicle electrification. Technologies that have been explored for various energy storage applications include pumped hydroelectric (PHE), compressed air (CAES), batteries, flywheels, and ultracapacitors. Among the technologies that are not geographically constrained, flow batteries show promise in terms of power rating (MW), response time, capital cost, and cycle life at 80 percent depth of discharge.

Broadly defined, a flow battery is an energy storage technology that utilizes reduction-oxidation (redox) states of various species for charge and discharge purposes. During the charge of a redox flow battery (RFB), electro-active material is pumped from an external reservoir into an electrochemical cell. Charge is stored in the form of chemical energy through changes in the charge state of the active material. Discharge occurs by reversing the process. Flow batteries are unique among charge storage devices because some designs can completely decouple power and energy.

The earliest flow battery designed was an iron-chromium battery. This battery contains aqueous chromium and iron solutions for the cathode and anode, respectively, and it has an open circuit potential of 1.2 V. Despite the low cost of the materials, this battery displays significant crossover of the electro-active species and thus significantly reduced capacity. In addition, the chromium redox reactions are sluggish and require a catalyst for reasonable performance. In order to mitigate crossover issues, an all-vanadium battery was developed with aqueous vanadium solutions for both the cathode and the anode. In the cathode, the vanadium cycles between the +5 and +4 oxidation states, and in the anode it cycles between +3 and +2. Like the iron-chromium chemistry, the all-vanadium battery has very low energy density due to the limited solubility of the electro-active material. In addition, the cathode displays significant temperature sensitivity that requires extensive thermal management. A promising aqueous flow battery in terms of energy density is the zinc-bromine system. However, a number of issues are still present with this chemistry, including bromine toxicity, zinc dendrite formation, and high self-discharge.

Recently a number of non-aqueous flow battery chemistries have emerged. Non-aqueous systems are of particular interest because they can have voltages that extend well beyond the electrolysis limit of water (~1.5 V). The earliest non-aqueous chemistry developed utilized ruthenium and iron bipyridine complexes. More recently, a series of metal acetylacetonate complexes have been developed. In all of these systems the same metal complex (in different oxidation states) is used as both the cathode and anode. A key problem is the low solubility of the electro-active species in organic solvents due to their generally lower dielectric constants. One way this has been avoided is to use semi-solid slurries of common lithium ion battery materials.

SUMMARY

Flow batteries are disclosed herein. In a general embodiment, the flow battery includes an electrolyte of an aqueous or non-aqueous polyoxometalate cluster as a charge storage material. In another embodiment, the present disclosure is directed to a method including introducing a polyoxometalate material into an anode portion of a cell (e.g., a flow battery cell) and/or a cathode portion of the cell and charging or discharging the cell.

Additional features and advantages are described herein, and will be apparent from the following Detailed Description and the figures.

BRIEF DESCRIPTION OF THE DRAWINGS

FIG. 3A shows a cyclic voltammograms of $H_4SiW_{12}O_{40}$ in aqueous 0.5 molar sulfuric acid ($H_2SO_4$) supporting electrolyte and a cyclic voltammogram of $K_6HSiV_3W_9O_{40}$ in aqueous 0.5 molar $H_2SO_4$.

FIG. 3B shows cyclic voltammograms of a Wells-Dawson polyoxometalate $((CH_3CH_2CH_2CH_2)_4N)_5H_4P_2V_3W_{15}O_{62}$ in 0.5 molar $LiCF_3SO_3$ in propylene carbonate and $K_8HP_2V_3W_{15}O_{62}$ in aqueous 0.5 molar $H_2SO_4$.

FIG. 3C shows representative cyclic voltammograms for an aqueous Keggin polyoxometalate $K_6HSiV_3W_9O_{40}$ in aqueous 0.5 molar $H_2SO_4$ and non-aqueous Keggin polyoxometalate $((CH_3CH_2CH_2CH_2)_4N)_4H_3SiV_3W_9O_{40}$ in 0.5 molar $LiCF_3SO_3$ in propylene carbonate in comparison to the aqueous Wells-Dawson polyoxometalate $K_8HP_2V_3W_{15}O_{62}$ in aqueous 0.5 molar $H_2SO_4$.

FIG. 3D shows a cyclic voltammogram for $K_{12}(CuOH_2)_3(PW_9O_{34})_2$ in aqueous 0.5 molar NaCl.

FIG. 6A shows voltage profiles of 20 millimolar $K_6HSiV_3W_9O_{40}$ in 0.5 M $H_2SO_4$ in a serpentine flow cell performed at 2 $mA/cm^2$ at a flow rate of 2.5 mL/min.

FIG. 6B shows the charge capacity and coulombic efficiency of the cell from FIG. 6A as a function of cycle number.

DETAILED DESCRIPTION

Polyoxometalates (POMs) are a large and highly modifiable class of inorganic compounds formed by the linkage of $d^0$ metal-centered polyhedra with oxygen atoms located at the vertices. The two most common linkages found in POM structures are corner and edge sharing. The $d^0$ metals that form these clusters include vanadium, niobium, tantalum, molybdenum, and tungsten and are called addenda atoms.

A polyoxometalate ion is typically an anion. Isopolyanions are formed exclusively from addenda polyhedra while heteropolyanions are formed with the addition of one or more "templating" polyhedra centered by virtually any element on the periodic table. POMs are of considerable interest because of their diverse and alterable sizes, shapes, charge densities, acidities, and reversible oxidation-reduction (redox) potentials.

Of the many POM structures known, the most common is the Keggin anion. The most stable form of this structure includes a single $XO_4$ (X=virtually any element) tetrahedron surrounded by four $M_3O_{13}$ triads at each of its vertices. Another common heteropolyanion structure is the Wells-Dawson species which includes two $XO_4$ tetrahedrons each coordinating one intact edge sharing $M_3O_{13}$ unit and three defect $M_3O_{13}$ units (each missing one $MO_3$ group). Most Keggin and Wells-Dawson complexes are not stable as fully intact structures at high pH. At higher pH values, a complex series of hydrolysis reactions occur in which one or more $MO_x$ units are removed from the parent structure. Upon re-acidification in the presence of vanadium, these defect structures react to reform mixed addenda (vanadium and tungsten) complexes.

Figure 1:
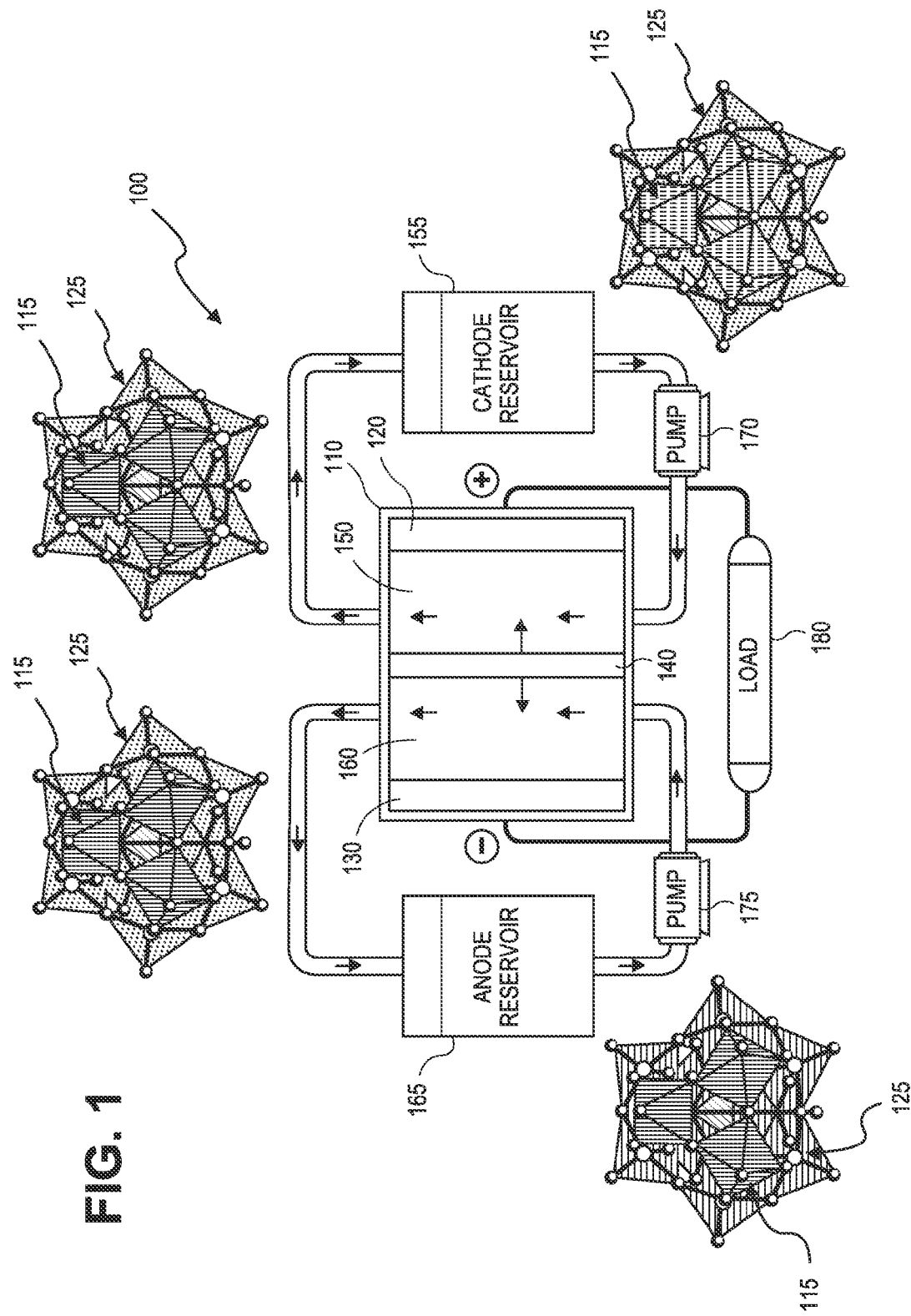
FIG. 1 shows a schematic side view representation of an embodiment of a flow battery at discharge.

FIG. 1 shows a schematic side view of an embodiment of a flow battery. Referring to FIG. 1, flow battery 100 includes cell 110 including cathode portion 150 and anode portion 160 separated by separator 140 (e.g., a proton or anion exchange membrane or porous separator). Disposed in cathode portion 150 is electrode 120 and disposed in anode portion 160 is electrode 130. Electrode 120 and electrode 130 are connected to opposite sides of load 180. Representatively, a suitable material for electrode 120 and electrode 130 is carbon felt, graphite or a d-block transition metal current collector.

Connected to cathode portion 150 is cathode reservoir 155. Connected to anode portion 160 of cell 110 is anode reservoir 165. Cathode reservoir 155 contains an electrolyte that is pumped by pump 170 through cathode portion 150 of cell 110. Anode reservoir 165 similarly contains an electrolyte that is pumped by pump 175 through anode portion 160. The electrolytes associated with cathode reservoir 155 and anode reservoir 165 act as energy carriers that are pumped simultaneously through cathode portion 150 and anode portion 160, respectively. In charging, the electrical energy supplied causes a chemical reduction reaction in one electrolyte and an oxidation reaction in the other. Separator 140 between cathode portion 150 and anode portion 160 inhibits the electrolytes from mixing but allow selected ions to pass through to complete the oxidation reduction (redox) reaction. On discharge, the chemical energy contained in the electrolyte is released in the reverse reaction and electrical energy can be drawn from electrode 120 and electrode 130. When in use, the electrolytes are typically continuously pumped in a circuit between cell 110 and the respective reservoirs (cathode reservoir 155 and anode reservoir 165).

In one embodiment, polyoxometalates are used as the electrolytes for one or both the anode portion and cathode portion of a flow battery. In one embodiment, cathode reservoir 155 contains a polyoxometalate material and anode reservoir 165 similarly contains a polyoxometalate material. The polyoxometalate material used in cathode portion 150 may be different from the polyoxometalate material used in anode portion 160. In another embodiment, the polyoxometalate material used in cathode portion 150 is similar to the polyoxometalate material used in anode portion 160. In this context, similar polyoxometalate materials mean atomically similar polyoxometalate ions which include either a d° or d-containing metal (s) at the same or different states. Representative polyoxometalate ions suitable as an electrolyte include, but are not limited to, those including a Keggin anion, a Lundquist anion, a Wells Dawson anion and a mixed addenda anion. Representative of a mixed addenda anion is a polyoxometalate ion that includes vanadium and tungsten. The polyoxometalate material may be an aqueous material or a non-aqueous material. A representative aqueous mixed addenda polyoxometalate material includes, but is not limited to, $K_6HSiV_3W_{12}O_{40}$. A non-aqueous polyoxometalate material is a material with an organic cation such as, but not limited to, a substituted or unsubstituted ammonium cation. An example of a substituted ammonium cation is tetra-n-butylammonium and an example of a non-aqueous mixed addenda polyosometalate material is $((CH_3CH_2CH_2CH_2)_4N)_4H_3SiV_3W_9O_{40}$. In a further embodiment, the polyoxometalate material is an alkaline material (e.g., a polyoxometalate anion including alkali metal or alkaline earth metal cations for aqueous salts) or a polyoxometalate anion.

Referring to FIG. 1, the schematic illustrates a redox flow battery during discharge. Also illustrated is a representation of a mixed addenda polyoxometalate ion drawn in combination polyhedral/ball- and stick-notation at various chemical stages. One advantage of using a mixed addenda polyoxometalate ion is that the same ion may be used for both oxidation and reduction reactions. Mixed addenda polyoxometalate containing vanadium and tungsten are one example of a suitable polyoxometalate ion because the electrochemistry of the vanadium centers is separated by about one volt from tungsten and therefore the material can be used as the electrolyte for both the cathode and anode. For a vanadium tungsten mixed addenda polyoxometalate for polyoxometalate anion, FIG. 1 shows reference numeral 115 identifying vanadium in the ion and reference numeral 125 identifying tungsten in the ion. Leaving cathode reservoir 155, the polyoxometalate anion includes vanadium centers 115 in an oxidized state ($V^V$) and tungsten 125 in an oxidized state ($W^{VI}$). Discharge from cathode portion 150 of cell 110 shows the polyoxometalate ion with vanadium in a reduced state ($V^{IV}$) and tungsten in an oxidized state ($W^{VI}$). Turning to the anode side of the flow battery, leaving the anode reservoir, the polyoxometalate anion includes vanadium in a reduced state ($V^{IV}$) and tungsten in a reduced state ($W^V$) entering anode portion 160 of cell 110. Leaving anode portion 160 of cell 110, the polyoxometalate anion includes vanadium in a reduced state ($V^{IV}$) and tungsten in an oxidized state ($W^{VI}$).

The suitability of polyoxometalate materials as charge storage materials for aqueous and non-aqueous flow battery technologies has been surprisingly found and demonstrated. A redox flow battery utilizing two, three-electron polyoxometalate redox couples ($SiV^V_3W^{VI}_9O_{40}^{7-}$/$SiV^{IV}_3W^{VI}_9O_{40}^{10-}$ and $SiV^{IV}_3W^{VI}_9O_{40}^{10-}$/$SiV^{IV}_3W^V_3W^{VI}_6O_{40}^{13-}$) showed coulombic efficiencies greater than 95 percent with relatively low capacity fading over 100 cycles. A representation of the four states of the polyoxometalate material and where they are located at discharge are illustrated in FIG. 1. Infrared studies showed no decomposition of the compound under these conditions. A non-aqueous analogue had a higher operating voltage at the expense of coulombic efficiency. Polyoxometalates also provide spontaneous formation by self-assembly that facilitates recovery of the battery after being subjected to reversed polarity.

1.0 Example

1.1 General Methods and Materials

All materials not synthesized were purchased from Sigma Aldrich or Alfa Aesar. Thermal analyses were measured with a TA Instruments Q600. Infrared spectra were recorded on a Thermo Nicolet iS10 FT-IR equipped with a Smart Orbit (Diamond) ATR accessory. The UV-visible absorption spectra (300-700 nm) were collected on a Thermo Scientific Evolution 220 UV-Visible Spectrophotometer. Solution NMR spectra were recorded on a Bruker Avance 500 spectrometer at 131.486 MHz and 99.372 MHz for $^{51}V$ and $^{29}Si$, respectively. For $^{51}V$ a 0.5 s recycle delay was employed, while for $^{29}Si$ a 60 s recycle delay was used. The chemical shifts were referenced to a secondary external standard of saturated $NaVO_3$ $\delta=-578$ ppm, and to neat TMS $\delta=0.0$ ppm. Cyclic voltammograms were collected under Ar (blanketed for aqueous electrochemistry and in an Argon glove box for non-aqueous electrochemistry) using a BASi Epsilon potentiostat. The working electrode was a freshly polished 3 mm diameter glassy carbon, platinum (Pt) wire was the counter electrode, and measurements were referenced to $Li/Li^+$. Conductivity measurements were made using a Solartron 1255B frequency analyzer with a SI 1287 electrochemical potentiostat using a commercial cell (cell constant=1). The sample was thermally equilibrated prior to measurement by placing the cell in a Tenney environmental chamber to control temperature.

1.2 Synthesis of Polyoxometalates

Polyoxotungstates were prepared by acid condensation reactions. The following syntheses are modified literature procedures to improve purity to greater than 99.5 percent. Purity is confirmed by IR, UV-Vis, cyclic voltammetry, and in some cases NMR.

1.2.1 Synthesis of $K_6HSiV_3W_9O_{40}$

Sodium metavanadate (6.4 g) was dissolved in 900 mL of deionized water and 8.4 mL of 12 M HCl was added to give a pale yellow solution. This was followed by adding 48 g of $Na_9HSiW_9O_{34}$ to the stirred solution to yield a deep red liquid. The solution was re-acidified with 2.8 mL of 12 M HCl, and 60 g of solid KCl was added with stirring. The resulting solid product is collected by filtration and dried in a vacuum oven overnight.

1.2.2 Synthesis of $((CH_3CH_2CH_2CH_2)_4N)_4H_3SiV_3W_9O_{40}$

A 40 g sample of $K_6HSiV_3W_9O_{40}$ was dissolved in 200 mL of pH 1.5 water, and then it was added slowly to a stirring solution containing 20 g of $((CH_3CH_2CH_2CH_2)_4N)Br$ in 100 mL of pH 1.5 water. After the addition was complete, the mixture was re-acidified to pH 1.5 with 12 M HCl. The resulting product was collected by filtration, washed with an equal volume of pH 1.5 water, and dried in a vacuum oven overnight.

1.2.3 Synthesis of $K_8HP_2V_3W_{15}O_{62}$

Sodium metavanadate (4 g) was dissolved in 700 mL of water and 16 mL of 6 M HCl was added to give a pale yellow solution. This was followed by adding 46 g of $Na_{12}P_2W_{15}O_{56}$ to the stirred solution to yield a red-orange liquid. Stirring was continued for an additional 10 minutes after the solution becomes homogeneous followed by the addition of 100 g of solid KCl. The resulting solid product is collected by filtration and dried in a vacuum oven overnight.

1.2.4 Synthesis of $((CH_3CH_2CH_2CH_2)_4N)_5H_4P_2V_3W_{15}O_{62}$

A 35 g sample of $K_8HP_2V_3W_{15}O_{62}$ was dissolved in 200 mL of pH 1.5 water and then added slowly to a stirring solution containing 25 g of $((CH_3CH_2CH_2CH_2)_4N)Br$ in 200 mL of pH 1.5 water. Simultaneously, 6 M HCl was used to maintain the pH between 1.4 and 1.6. The resulting product was collected by filtration, washed with an equal volume of pH 1.5 water, and dried in a vacuum oven overnight.

1.2.5 Synthesis of $K_{12}(CuOH_2)_3(PW_9O_{34})_2$

A 30 g sample of $Na_9PW_9O_{34}$ and 3.3 g of $Cu(NO_3)_2$ were simultaneously added to 250 mL of deionized water. The mixture was stirred until a clear solution was obtained and 34 g of KCl was added. The resulting product was collected by filtration and recrystallized from an aqueous solution by slow evaporation of water.

1.3 Battery Cycling

1.3.1 Static Cell Testing

An H-type cell with two 15 mL electrolyte compartments was used for charge-discharge experiments. The solutions in each compartment were stirred using a Teflon coated magnetic stir bar. The galvanostatic measurements were performed on a Solartron SI 1287 potentiostat under constant current conditions. The electrolytes were separated using a Nafion 115 membrane with a surface area of 1 $cm^2$. Prior to use, the membranes were soaked in their respective test solutions overnight. Two (area 2 $cm^2$) graphite electrodes were used for charge-discharge purposes. Aqueous experiments were performed in air and non-aqueous experiments were performed in an Argon glove box.

1.3.2 Flow Cell Testing

The flow cells consisted of two carbon-felt electrodes, two graphite current collectors with machined serpentine or circular flow fields (Fuel Cell Technologies), two gaskets, and a Nafion 117 membrane. The carbon felt (GFD grade from SGL carbon, 2.5 mm nominal thickness) was treated under $O_2$ plasma for 5 minutes on each side using the Harrick Plasma cleaner (model PDC-001). The active area of the electrode for both the serpentine and circular configurations was 5 $cm^2$. The system includes a single cell, two peristaltic pumps (Masterflex L/S), two polypropylene reservoirs, and Viton tubing. A Solartron 1287 potentiostat was used to control the charging and discharging of the electrolytes. All flow cell experiments were performed at room temperature.

2.0 Results

2.1 Synthesis

2.1.1 Mixed Addenda POMs

Figure 2:
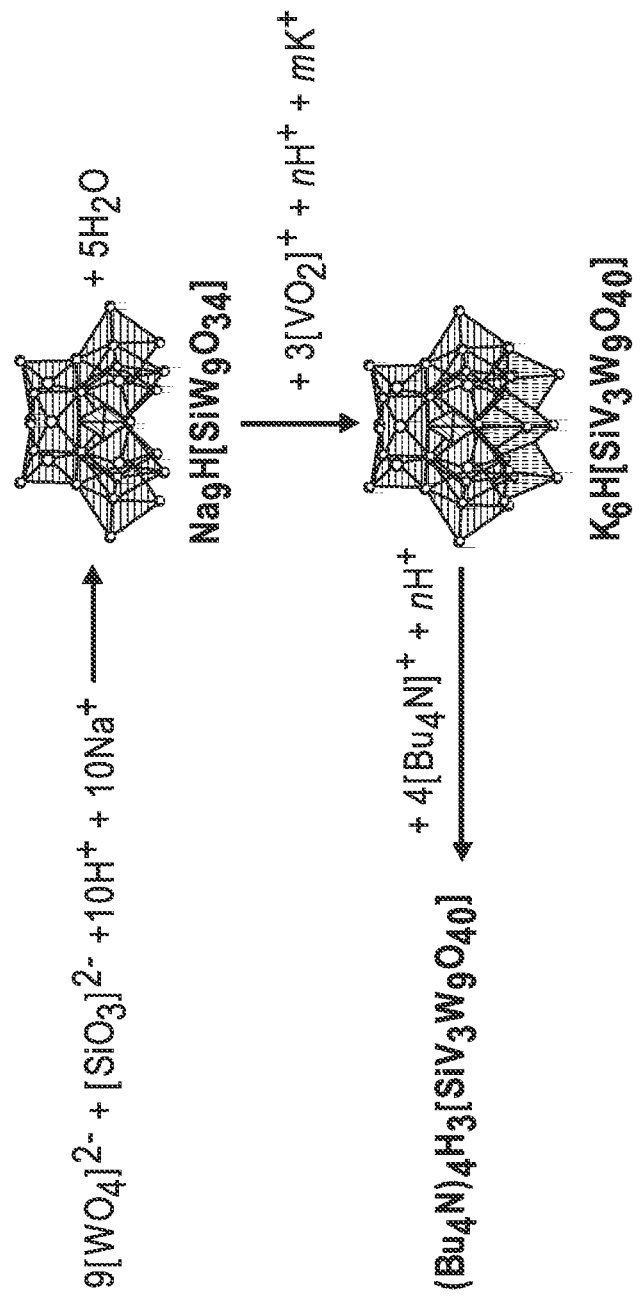
FIG. 2 shows a synthesis of $K_6HSiV_3W_9O_{40}$ and $((CH_3CH_2CH_2CH_2)_4N)_4H_3SiV_3W_9O_{40}$.

Initial work focused on the stability and reactivity of commercially available heteropolyacids ($H_3PMo_{12}O_{40}$, $H_3PW_{12}O_{40}$, $H_4SiMo_{12}O_{40}$, and $H_4SiW_{12}O_{40}$) since most aqueous flow batteries employ strongly acidic electrolytes to maintain stability and enhance electrochemical reversibility. However, a highly acidic medium (and subsequently high ionic strength) significantly suppresses the current. As a result, in one embodiment, alkaline polyoxometalate materials (e.g., to alkaline and ammonium materials) were studied. Two mixed addenda POMs, $SiV_3W_9O_{40}^{7-}$ and $P_2V_3W_{15}O_{62}^{9-}$, were selected for study because (1) they could be prepared in high yield and high purity, (2) the electrochemistry of the vanadium centers is separated by at least 1 V from the tungsten activity and therefore the material could be used as both the cathode and anode, (3) the compounds could be prepared as aqueous and non-aqueous soluble salts, (4) under certain conditions these compounds can undergo multi-electron reactions and therefore could achieve higher energy density, and (5) these compounds are stable over a wide range of temperatures and pH. The synthesis of both the aqueous and non-aqueous soluble salts of $SiV_3W_9O_{40}^{7-}$ is illustrated in FIG. 2. The first step is an acid hydrolysis reaction and this is followed by vanadium incorporation. The aqueous soluble salt is converted to its non-aqueous soluble analogue via a metathesis reaction (exchange of potassium for tetra-n-butyl-ammonium).

2.1.2 Transition Metal Substituted POMs

Transition metal substituted POMs are formed when a defect POM (such as $Na_9HSiW_9O_{34}$, illustrated in FIG. 2 reacts with a d-electron-containing transition metal. This is distinct from the process illustrated in FIG. 2 in that vanadium (+5) is a $d^0$ metal. The distinction is not trivial because the d-electron-containing metals have considerably larger ionic radii. The insertion of a metal into a rigid space designed for a smaller metal can cause considerable structural perturbations that in term strongly influence the electronic properties of the resulting complex. In addition, the terminal ligand position is water instead of $O^{2-}$ when a d-electron containing metal is present. The water ligand is more labile than $O^{2-}$ and can cause the complex to react with solvent or other species present in the solution.

A number of literature compounds were examined for electrochemical activity as well as stability. Compounds formed from the reaction of defect Keggin compounds ($PW_9O_{34}^{9-}$ and $SiW_9O_{34}^{10-}$) with first row transition metals generally formed compounds with very poor stability. One important exception was the reaction of $PW_9O_{34}^{9-}$ with $Cu(NO_3)_2$ to generate the sandwich-type compound $(CuOH_2)_3(PW_9O_{34})_2^{12-}$. A low resolution X-ray crystal structure revealed this compound has not been previously published. Another sandwich-type compound that was identified to have promising stability and electrochemical activity was $((FeOH_2)_2ZnW)(ZnW_9O_{34})_2^{12-}$. This compound is not formed from a defect Keggin structure but rather from thermal decomposition of a fully intact structure followed by direct metal substitution.

2.2 Electrochemical Studies

2.2.1 Cyclic Voltammetry

A common feature in the cyclic voltammograms (CVs) of POMs is the presence of several reversible diffusion-controlled waves. A representative CV of $H_4SiW_{12}O_{40}$ (in aqueous 0.5 M $H_2SO_4$ supporting electrolyte) is shown in FIG. 3A. The results show two reversible one-electron waves and one reversible two-electron process. All of the waves are attributed to reduction (and re-oxidation) of the W(VI) centers present in the molecule. A CV of $K_6HSiV_3W_9O_{40}$ (in aqueous 0.5 M $H_2SO_4$ supporting electrolyte) is also shown in FIG. 3A (superimposed with $H_4SiW_{12}O_{40}$). The three tungsten-based peaks in $H_4SiW_{12}O_{40}$ have now become two, two-electron processes. This was confirmed by bulk electrolysis and is consistent with the literature. There are also peaks between 4.3 and 4.8 V (versus $Li/Li^+$) that are assigned to vanadium-based processes. Bulk electrolysis (at 4 V, versus $Li/Li^+$) indicates that the two peaks combined are attributable to a three-electron process although only two are resolvable (see Table 1). A square wave voltammogram (between 4.3 and 4.8 V, versus $Li/Li^+$) indicates that the wave centered at 4.5 V is actually two poorly resolved peaks. Although highly symmetrical POMs show significant electron mobility across the metal centers, previous EPR studies on the lower symmetry vanadium-substituted polytungstates show that the waves between 4.3 and 4.8 V (versus $Li/Li^+$) are primarily centered around vanadium while those between 3.4 and 4.0 V are tungsten centered. The CVs of the Wells-Dawson $((CH_3CH_2CH_2CH_2)_4N)_5H_4P_2V_3W_{15}O_{62}$ (in 0.5 M $LiCF_3SO_3$ in propylene carbonate) and $K_8HP_2V_3W_{15}O_{62}$ (in aqueous 0.5 M $H_2SO_4$) are shown in FIG. 3B. The non-aqueous POM is more difficult to reduce than its aqueous analogue. There is also a wider separation between the vanadium and tungsten electrochemistry in the non-aqueous system. FIG. 3C shows the CVs for the vanadium-centered redox processes for the aqueous ($K_6HSiV_3W_9O_{40}$ in 0.5 M $H_2SO_4$) and non-aqueous $((CH_3CH_2CH_2CH_2)_4N)_4H_3SiV_3W_9O_{40}$ in 0.5 M $LiCF_3SO_3$ in propylene carbonate) in comparison to the aqueous Wells-Dawson $K_8HP_2V_3W_{15}O_{62}$ (in aqueous 0.5 M $H_2SO_4$). In contrast to the Keggin (both aqueous and non-aqueous), the Wells-Dawson only displays one peak for the vanadium reduction and re-oxidation. However, like the Wells-Dawson, the aqueous Keggin is considerably easier to reduce than its non-aqueous analogue. A CV for $K_{12}(CuOH_2)_3(PW_9O_{34})_2$ (in aqueous 0.5 M NaCl) is shown in FIG. 3D. An irreversible wave at 3.4 V (versus $Li/Li^+$) is attributable to the plating of copper from the POM. This is also consistent with hysteresis observed at 3.7 V (versus Li/Li). Oxidation peaks appear at 4.0, 4.3, and 4.4 V (versus Li/Li), but it is not entirely clear if they are attributable to copper or tungsten.

TABLE 1

| Compound | Potential (V) (vs $Li/Li^+$) | Charge (C) | Calculated # electrons |
|---|---|---|---|
| $K_6HSiV_3W_9O_{40}$ | 3.1 | −68.7 | 3.56 |
| $((CH_3CH_2CH_2CH_2)_4N)_4H_3SiV_3W_9O_{40}$ | 2.675 | −38.2 | 1.98 |
| $K_8HP_2V_3W_{15}O_{62}$ | 3.0 | −109 | 5.65 |
| $((CH_3CH_2CH_2CH_2)_4N)_5H_4P_2V_3W_{15}O_{62}$ | 2.0 | −12.3 | 0.636 |

2.2.2 Static Cell Studies

Figure 4:
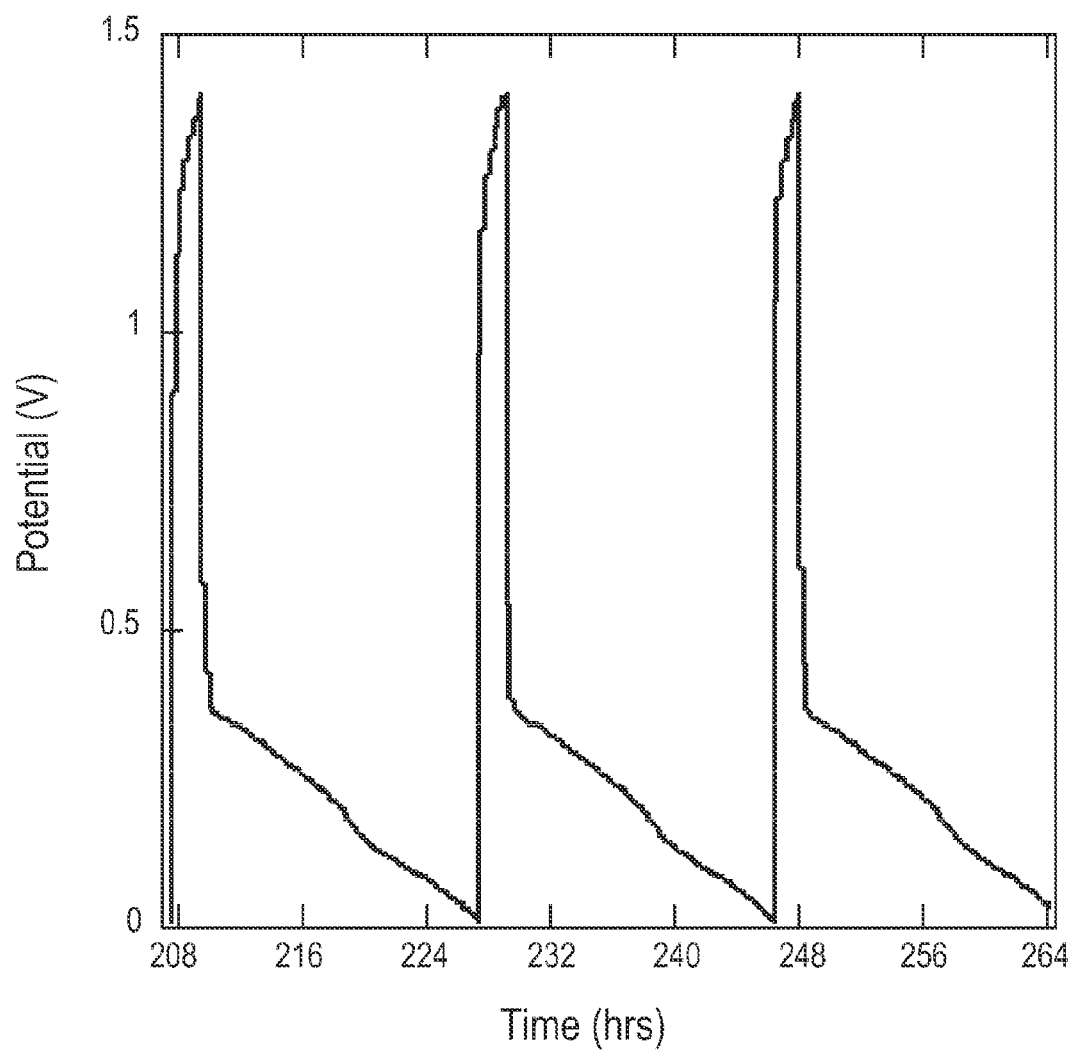
FIG. 4 shows charge-discharge (voltage vs. time) curves for an aqueous Keggin polyoxometalate H-cell of 20 millimolar $K_6HSiV_3W_9O_{40}$/0.5 molar aqueous $H_2SO_4$.

The charge-discharge characteristics of the POMs were investigated at room temperature in a static cell comprised of two 15 mL compartments separated by a Nafion 117 membrane with an active area of 1 cm². Galvanostatic cycling performed on a static cell containing 20 mM $K_6HSiV_3W_9O_{40}$ and 0.5 M $H_2SO_4$ (as the supporting electrolyte) yielded a relatively large difference between charge voltage and discharge voltage (approximately 1 V) as seen in FIG. 4. This was likely due to significant ohmic losses resulting from the small membrane area (1 cm²) and the large distance (2 cm) between the electrodes. The low electrode surface area of the graphite plates and the lack of solution convection may have also contributed to the large cell overpotentials. The coulombic efficiency leveled out at 96% after the second cycle.

Bulk electrolysis measurements (all with greater than 99% yield) on $K_6HSiV_3W_9O_{40}$ show that each side of the cell underwent three-electron transfer during cycling. In the case of $K_6HSiV_3W_9O_{40}$, this means the cathode (positive electrode) cycled between $SiV^V_3W^{VI}_9O_{40}^{7-}$ (fully charged) and $SiV^{IV}_3W^{VI}_9O_{40}^{10-}$ (fully discharged), and the anode (negative electrode) cycled between $SiV^{IV}_3W^V_3W^{VI}_6O_{40}^{13-}$ (fully charged) and $SiV^{IV}_3W^{VI}_9O_{40}^{10-}$ (fully discharged). Prior to the assembly of the cell, bulk electrolysis was also used to generate $SiV^{IV}_3W^V_3W^{VI}_6O_{40}^{13-}$ for the anode. Thus the cell was fully charged at the beginning of each cycling experiment.

Figure 5A:
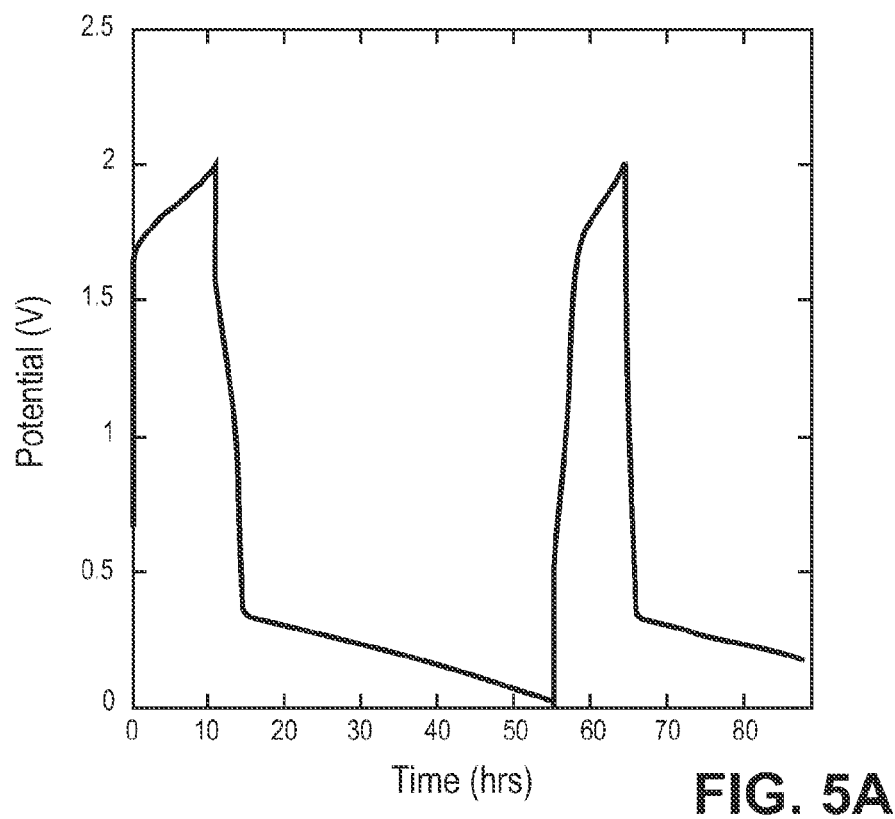
FIG. 5A shows charge-discharge curves for a non-aqueous Keggin polyoxometalate of 20 millimolar $((CH_3CH_2CH_2CH_2)_4N)_4H_3SiV_3W_9O_{40}$/0.5 molar $(CH_3CH_2CH_2CH_2)_4N(CF_3SO_3)$.
Figure 5B:
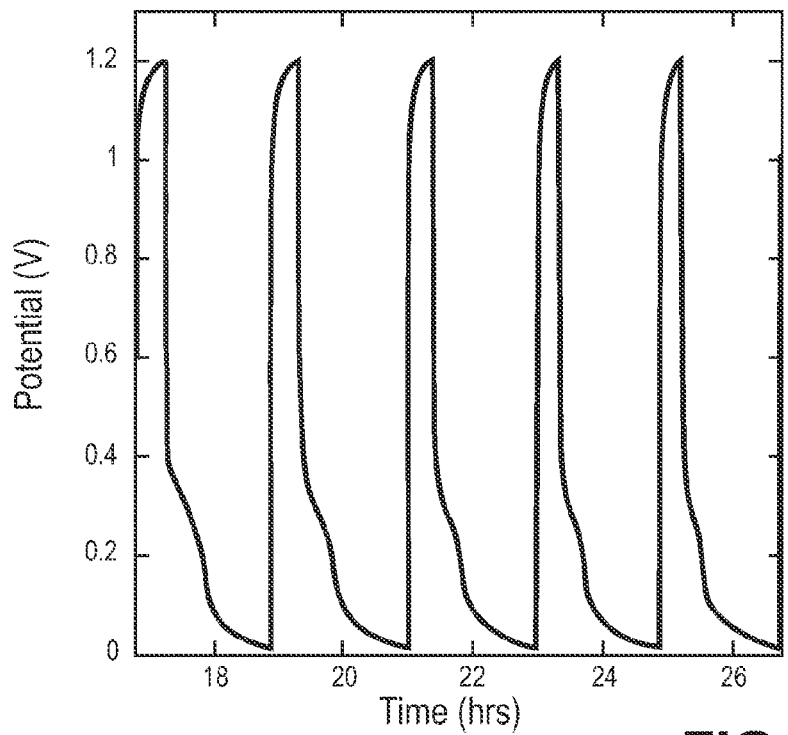
FIG. 5B shows charge-discharge curves for an aqueous Wells-Dawson polyoxometalate of 20 millimolar $K_8HP_2V_3W_{15}O_{62}$/0.5 molar $H_2SO_4$.

Charge-discharge characteristics for the 20 mM $(CH_3CH_2CH_2CH_2)_4N)_4H_3SiV_3W_9O_{40}/0.5$ M $(CH_3CH_2CH_2CH_2)_4N(CF_3SO_3)$ in propylene carbonate and for 20 mM $K_8HP_2V_3W_{15}O_{62}/0.5$ M aqueous $H_2SO_4$ are shown in FIG. 5A and FIG. 5B, respectively. The charge voltage plateaus around 1.7 V and the discharge plateaus around 0.3 V for the non-aqueous Keggin system (FIG. 5A). The rate of charge and discharge were 0.25 mA and 0.050 mA, respectively. Bulk electrolysis shows that each side cycles between two electrons in the charge and discharge states. The charge voltage for the aqueous Wells-Dawson plateaus around 1.0 V while the discharge plateaus around 0.3 V (FIG. 5B). With the equilibrium potential of 1.0 V (FIG. 3B), the overpotentials for the charge and discharge are 0.2 V and 1.0 V, respectively. The rate of charge and discharge were 2.5 mA and 0.25 mA, respectively. Bulk electrolysis shows that each side cycles between six electrons (based on measurements for the vanadium sites). The decay in the charge plateau is consistent with the visual observation that the solution is decomposing over time.

2.2.3 Flow Cell Studies

The performance of $K_6HSiV_3W_9O_{40}$ (20 mM) in 0.5 M $H_2SO_4$ (as supporting electrolyte) was tested at room temperature by cycling it 100 times in a laboratory-scale flow cell with serpentine flow fields, carbon felt electrodes, and a Nafion 117 membrane. Galvanostatic cycling was performed at 2 mA/cm$^2$ with 0.05 V and 1.4 V as voltage limits. FIG. 6A shows the voltage profile for the $2^{nd}$ and $100^{th}$ cycle. The capacity of the first charge plateau almost doubled from the $2^{nd}$ to the 100th cycle (with a concurrent voltage increase) while that of the second charge plateau partially diminished. The voltage efficiencies for the first and second plateaus in the $100^{th}$ cycle were approximately 99% and 30%, respectively. As shown in FIG. 6B, the overall coulombic efficiency was greater than 95% with less than 2% loss over 100 cycles, and the charge capacity decreased by about 10% over the same period. Cell performance can also be characterized with the "electrochemical yield," which is defined here as the observed capacity during charge or discharge divided by the theoretical capacity. Theoretical capacity is calculated using the solution concentration, solution volume, and the number of electrons transferred per molecule of active material. The electrochemical yield of the flow cell containing $K_6HSiV_3W_9O_{40}$ decreased from 90% to 80% during the first 100 cycles.

The non-aqueous analogue 3 (20 mM) in 0.5 M TBAOTf in propylene carbonate was tested in a circular flow cell at 0.5 mA/cm$^2$ with 0.05 V and 2.5 V as voltage limits. While the initial coulombic efficiency was 87% and the open-circuit voltage was slightly improved (0.3 V higher than the aqueous system), the charge and discharge rate as well as the electrochemical yield were 65% and 15% lower than both the serpentine and circular aqueous flow systems of $K_6HSiV_3W_9O_{40}$, respectively. After 10 cycles, there was a drop in the electrochemical yield of the system.

Polyoxometalates offer a new approach to high energy density stationary storage materials because they are capable of undergoing multi-electron reactions and are stable over a wide range of pH values and temperatures.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A flow battery comprising:
    an electrochemical cell comprising an anode portion, a cathode portion and a separator disposed between the anode portion and the cathode portion, wherein each of the anode portion and the cathode portion comprises a same polyoxometalate material comprising a mixed addenda anion comprising vanadium and tungsten; and
    an anode electrode disposed in the anode portion; and
    a cathode electrode disposed in the cathode portion.

2. The flow battery of claim 1, wherein the anode electrode and the cathode electrode are each connected to a load.

3. The flow battery of claim 1, further comprising an anode reservoir coupled to the anode portion of the cell and a cathode reservoir coupled to the cathode portion.

4. A method comprising:
    introducing a same polyoxometalate material comprising a mixed addenda anion comprising vanadium and tungsten into each of an anode portion and a cathode portion of an electrochemical cell; and
    charging or discharging the cell.

* * * * *